(12) United States Patent
Polcak

(10) Patent No.: US 12,650,319 B2
(45) Date of Patent: Jun. 9, 2026

(54) SYSTEMS AND METHODS FOR DETECTING AND WARNING OF AIRCRAFT ROLLOVER CONDITIONS

(71) Applicant: HONEYWELL INTERNATIONAL INC., Charlotte, NC (US)

(72) Inventor: Marek Polcak, Seninka (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 21 days.

(21) Appl. No.: 18/780,772

(22) Filed: Jul. 23, 2024

(65) Prior Publication Data

US 2026/0029250 A1      Jan. 29, 2026

(51) Int. Cl.
G01C 23/00          (2006.01)
B64C 27/00          (2006.01)
(52) U.S. Cl.
CPC .......... G01C 23/005 (2013.01); B64C 27/006 (2013.01)
(58) Field of Classification Search
CPC ............................ G01C 23/005; B64C 27/006
See application file for complete search history.

(56) References Cited

U.S. PATENT DOCUMENTS

| | | | | |
|---|---|---|---|---|
| 6,542,073 | B2 * | 4/2003 | Yeh ................... | B60R 21/01336 |
| | | | | 340/471 |
| 6,584,388 | B2 * | 6/2003 | Schubert ............... | B60R 21/013 |
| | | | | 701/46 |
| 8,095,269 | B2 | 1/2012 | Pruett et al. | |
| 9,008,872 | B2 | 4/2015 | Pflug et al. | |
| 9,734,726 | B2 | 8/2017 | Enns et al. | |
| 10,099,802 | B2 | 10/2018 | Reddy et al. | |
| 10,227,140 | B2 * | 3/2019 | McKay .................. | B64D 43/02 |
| 2014/0070048 | A1 | 3/2014 | Dequin | |
| 2015/0127212 | A1 * | 5/2015 | Chacon ................... | G01S 19/14 |
| | | | | 701/32.4 |
| 2018/0229857 | A1 | 8/2018 | Reddy et al. | |
| 2020/0116751 | A1 * | 4/2020 | Tang .................... | G05D 1/0825 |

FOREIGN PATENT DOCUMENTS

| | | |
|---|---|---|
| DE | 102020134583 A1 | 6/2022 |
| KR | 101411640 B1 | 6/2014 |

\* cited by examiner

*Primary Examiner* — John A Tweel, Jr.
(74) *Attorney, Agent, or Firm* — Ingrassia Fisher & Lorenz LLP

(57)          ABSTRACT

Systems and methods are provided for detecting and warning of aircraft rollover conditions. The systems include one or more sensors onboard the aircraft and a controller onboard the aircraft that is in operable communication with the one or more sensors. The controller is configured to, by one or more processors: receive input data from the one or more sensors and, optionally, one or more other sources, process the input data to dynamically determine a roll angle of the aircraft, an angular roll rate of the aircraft, and a critical rollover angle of the aircraft, determine whether current or potential static or dynamic rollover conditions of the aircraft exist based, at least in part, on the roll angle, the angular roll rate, and the critical rollover angle, and generate an alert in response to determining that the current or potential static or dynamic rollover conditions exist.

20 Claims, 6 Drawing Sheets

10

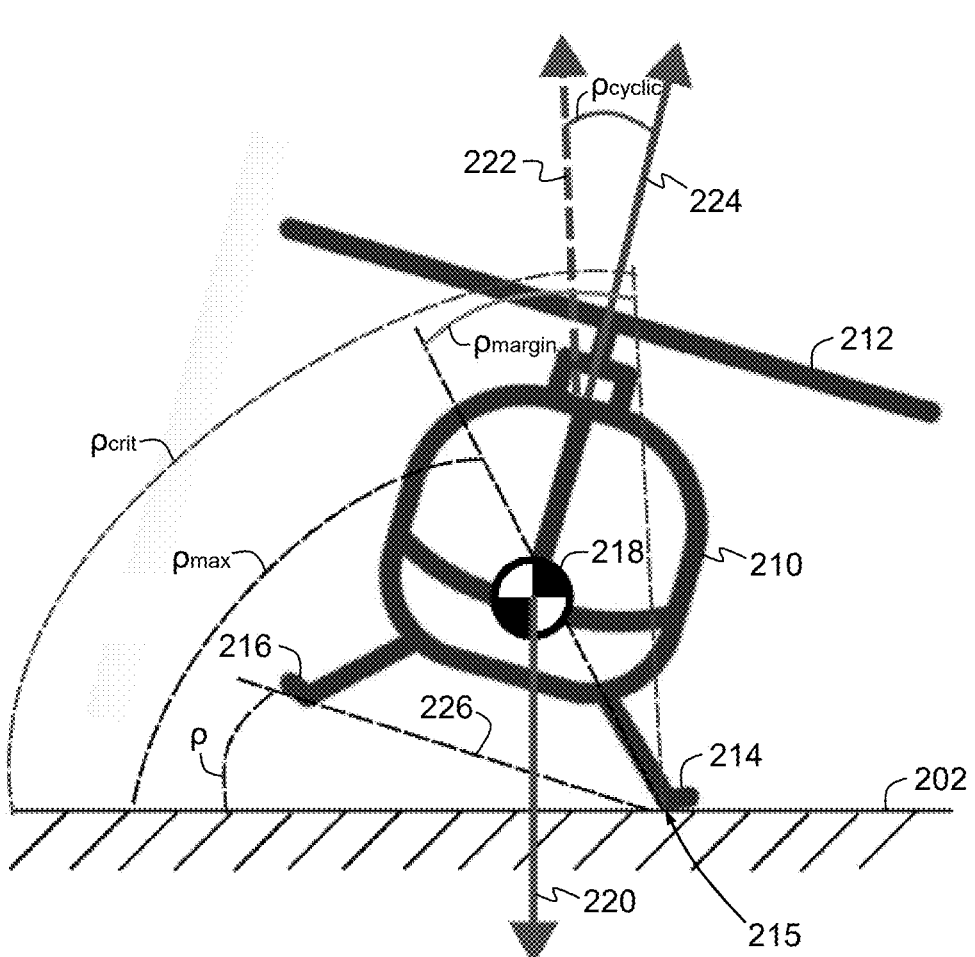
FIG. 2

500

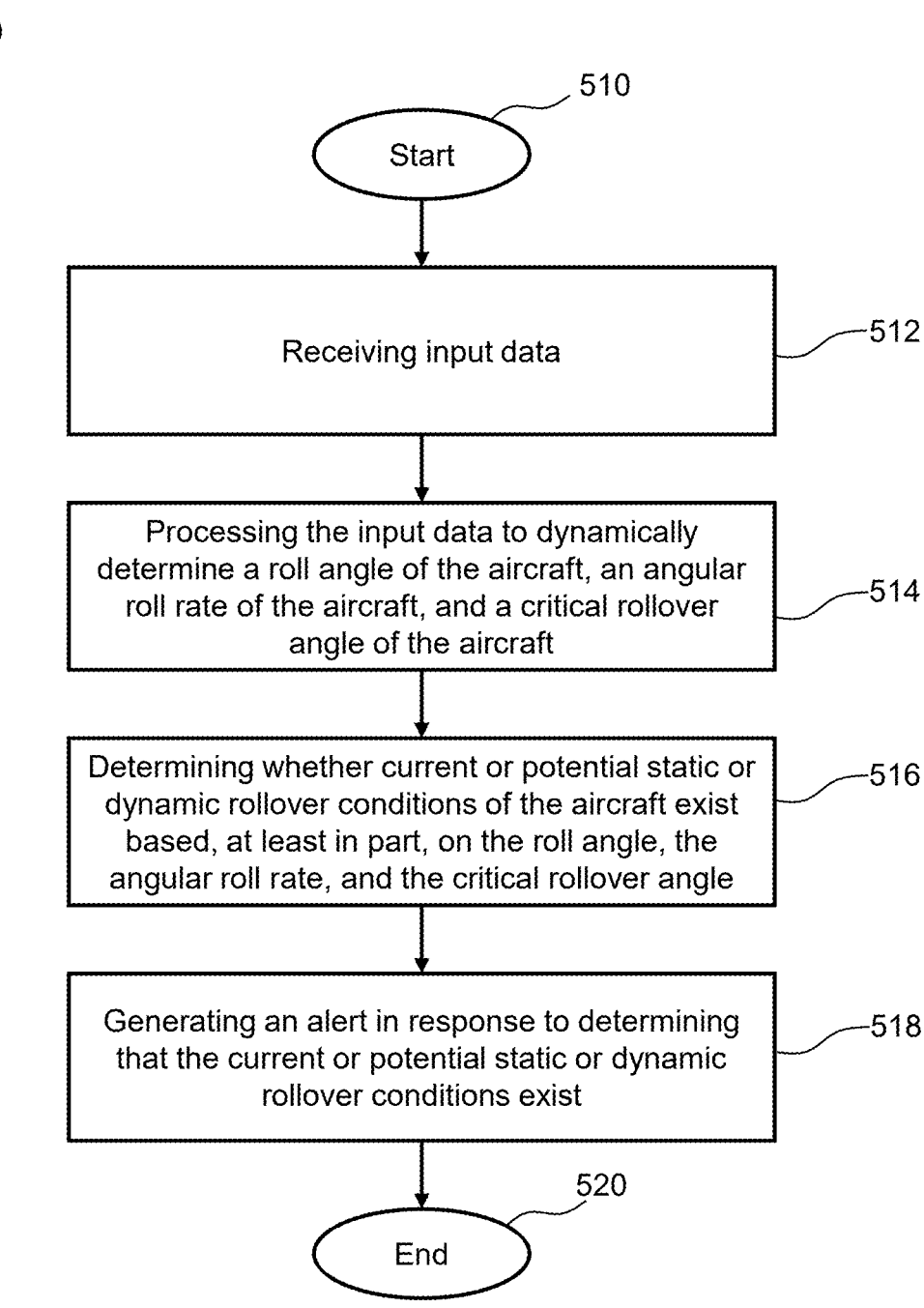

510

Start

512

Receiving input data

514

Processing the input data to dynamically determine a roll angle of the aircraft, an angular roll rate of the aircraft, and a critical rollover angle of the aircraft

516

Determining whether current or potential static or dynamic rollover conditions of the aircraft exist based, at least in part, on the roll angle, the angular roll rate, and the critical rollover angle

518

Generating an alert in response to determining that the current or potential static or dynamic rollover conditions exist

520

End

SYSTEMS AND METHODS FOR DETECTING AND WARNING OF AIRCRAFT ROLLOVER CONDITIONS

TECHNICAL FIELD

The present invention generally relates to aircraft systems, and more particularly relates to systems and methods for detecting and warning of static or dynamic rollover conditions.

BACKGROUND

Rotary-wing aerial vehicles, such as helicopters, must be properly operated to avoid certain dangerous conditions, such as conditions that result in dynamic rollover. Dynamic rollover is an unlikely but possible situation that may occur when a landing gear element (e.g., wheel or skid) of, for example, a helicopter is in contact with a surface or obstacle and the helicopter pivots about the landing gear element. If the pilot fails to respond with corrective actions, the roll angle of the helicopter may increase to an extent sufficient for the center of gravity of the helicopter to pass laterally over the landing gear element and causing the helicopter to roll onto or toward its side which may result in contact between the main rotor of the helicopter and the ground potentially damaging the helicopter and/or its surroundings. Factors that may result in dynamic rollover may include, for example, crosswinds, pilot error during low-altitude hovering, or an uneven landing area.

Modern aircraft provide various onboard systems intended to assist in the operation of the aircraft and/or promote a pilot's capability of operating the aircraft safely. However, there is an ongoing desire for improved systems and methods that promote safe operation of aircraft, such as preventing or reducing a likelihood of dynamic rollover of a rotary-wing aerial vehicle. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe example concepts in a simplified form that are further described in the Detailed Description. This summary is not intended to identify key or essential features of the claimed subject matter, nor is it intended to be used as an aid in determining the scope of the claimed subject matter.

In various examples, a method is provided that includes, by one or more processors of a controller onboard an aircraft: receiving input data, processing the input data to dynamically determine a roll angle of the aircraft, an angular roll rate of the aircraft, and a critical rollover angle of the aircraft, determining whether current or potential static or dynamic rollover conditions of the aircraft exist based, at least in part, on the roll angle, the angular roll rate, and the critical rollover angle, and generating an alert in response to determining that the current or potential static or dynamic rollover conditions exist.

In various examples, a system for an aircraft is provided that includes one or more sensors onboard the aircraft and a controller onboard the aircraft that is in operable communication with the one or more sensors. The controller is configured to, by one or more processors: receive input data from the one or more sensors and, optionally, one or more other sources, process the input data to dynamically determine a roll angle of the aircraft, an angular roll rate of the aircraft, and a critical rollover angle of the aircraft, determine whether current or potential static or dynamic rollover conditions of the aircraft exist based, at least in part, on the roll angle, the angular roll rate, and the critical rollover angle, and generate an alert in response to determining that the current or potential static or dynamic rollover conditions exist.

In various examples, an aircraft is provided that includes at least first and second landing gear elements each configured to contact a surface and support the aircraft thereon, a sensor system including a plurality of sensors including a first sensor configured to measure a first height of the first landing gear element from the surface and a second sensor configured to measure a second height of the second landing gear element from the surface, and a controller in operable communication with the sensor system. The controller is configured to, by one or more processors: receive input data from the sensor system and, optionally, one or more other sources, wherein the input data includes the first height and the second height, process the input data to dynamically determine a roll angle of the aircraft, an angular roll rate of the aircraft, and a critical rollover angle of the aircraft, determine whether current or potential static or dynamic rollover conditions of the aircraft exist based, at least in part, on the roll angle, the angular roll rate, the critical rollover angle, the first height, and the second height, and generate an alert in response to determining that the current or potential static or dynamic rollover conditions exist.

Furthermore, other desirable features and characteristics of the method, system, and aircraft will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 2 is a diagram illustrating the mobile platform while in contact with a surface and rotated at a critical rollover angle in accordance with an embodiment;

FIG. 5 is a flowchart illustrating an exemplary first method for detection and warning of rollover conditions in accordance with an embodiment.

DETAILED DESCRIPTION

Figure 1:
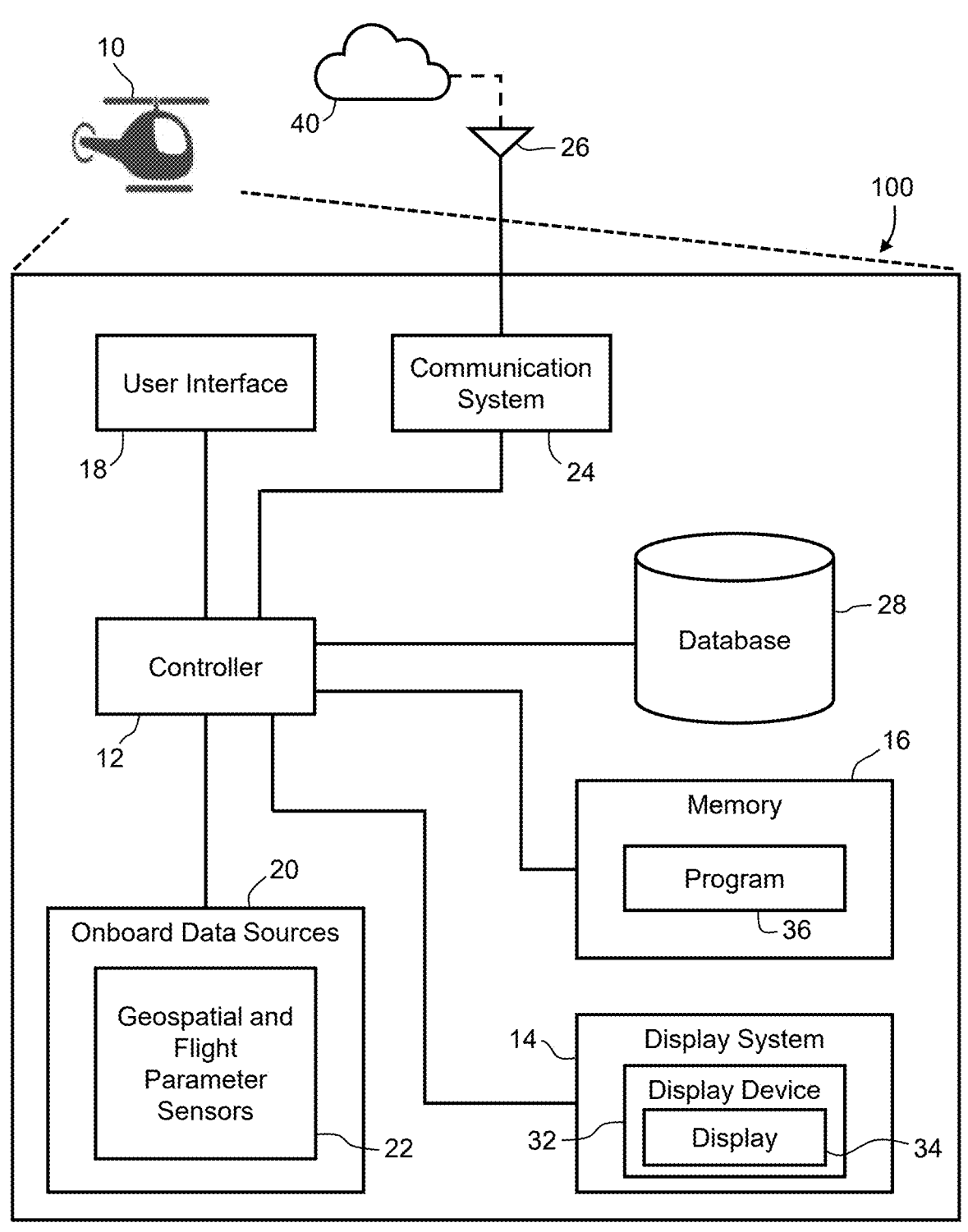
FIG. 1 schematically represents an aircraft and components of a rollover detection and warning system thereof in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for automatically detecting potential and/or imminent rollover conditions for a mobile platform and presenting information and/or alerts indicating the detected rollover conditions onboard the mobile platform in response to detection of the rollover conditions. In some examples, the systems and methods may include presenting information relating to corrective actions that may be performed to prevent or reduce a likelihood of rollover of the mobile platform. In some examples, the systems and methods may include automatically modifying operation of the mobile platform, for example, with an autopilot system, to prevent or reduce a likelihood of rollover of the mobile platform. The systems and methods may be used to detect rollover conditions associated with static rollover and dynamic rollover.

As used herein, rollover of a mobile platform refers to a condition wherein the mobile platform contacts a surface with a landing gear element thereof (e.g., a skid or a wheel), and the mobile platform rotates around a pivot point at the contact point between the surface and the landing gear element sufficiently to cause the mobile platform to tip onto a side thereof.

As used herein, static rollover refers to a lateral rolling tendency that occurs when a bank angle, that is an angle between a landing gear element of the mobile platform and a surface on which the landing gear element rests exceeds a critical static rollover angle. For example, static rollover may occur for a helicopter when a center of gravity of the helicopter is located laterally outside of a contact point between the landing gear element and the surface. In this condition, the helicopter may rollover (i.e., tip laterally) without outside forces acting upon it. For some helicopters, the critical static rollover angle may be about 30 to 40 degrees.

As used herein, dynamic rollover refers to a lateral rolling tendency that occurs when the mobile platform rotates around a fixed pivot point other than its center of gravity until a critical dynamic rollover angle of the is reached. For dynamic rollover, an outside force (e.g., crosswinds) may be acting upon the mobile platform that contributes to a likelihood of rollover. As such, the critical dynamic rollover angle may be less than the critical static rollover angle for a mobile platform. Further, the critical static rollover angle may be a fixed value based on a configuration of the mobile platform, whereas the critical dynamic rollover angle may vary based on the outside force acting upon the mobile platform. Dynamic rollover generally occurs when the mobile platform is landing, hovering, or taking off. Once the critical dynamic rollover angle has been exceeded, recovery is not possible regardless of any preventative actions performed (e.g., cyclic corrections).

The mobile platform may be any type of vehicle, such as but not limited to various types of aircraft. It should be noted that the term aircraft, as utilized herein, may include any manned or unmanned object capable of flight. The systems and methods disclosed herein may be particularly applicable to certain rotary-wing aerial vehicles, such as a helicopter, drone, hovercraft, or other rotary-winged aircraft, configured to derive both lift and propulsion from one or more sets of horizontally revolving rotors, and which is capable of moving vertically and horizontally, the direction of motion being controlled by the pitch of the rotor blades. For convenience, the systems and methods will be described in reference to a manned helicopter; however, as noted the systems and methods are not limited to such application.

Referring now to FIG. 1, an aircraft 10, in this example a helicopter, and certain systems thereof are illustrated in accordance with an exemplary and non-limiting embodiment of the present disclosure. A rollover detection and warning system 100 may be utilized onboard the aircraft 10 as described herein. As schematically depicted in FIG. 1, the system 100 may include and/or be functionally coupled to the following components or subsystems, each of which may assume the form of a single device or multiple interconnected devices, including, but not limited to, a controller 12 operationally coupled to: at least one display device 32, which may optionally be part of a larger on-board display system 14, computer-readable storage media or memory 16, an optional user interface 18, onboard data sources 20 including, for example, an array of geospatial and flight parameter sensors 22, and a communication system 24 including an antenna 26, which may wirelessly transmit data to and receive data from various external sources 40 physically and/or geographically remote to the system 100 and/or the aircraft 10. The system 100 may be separate from or integrated within a flight management system (FMS) and/or a flight control system (FCS).

Although schematically illustrated in FIG. 1 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the aircraft 10.

The term "controller," as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or nonvolatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the aircraft 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the aircraft 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between onboard systems, the controller 12, and the one or more external sources 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the aircraft 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for operating one or more systems of the aircraft 10 may be part of the system 100. In certain embodiments, the source is one or more databases 28 employed to receive and store data, which may be updated on a periodic or iterative basis to ensure data timeliness. In various embodiments, the data may include various relevant information, such as terrain locations and elevations, and may be stored in the memory 16 or in the one or more databases 28, and referenced by the program 36. In various embodiments, these databases 28 may be available online and accessible remotely by a suitable wireless communication system, such as the communication system 24.

The sensors 22 supply various types of data and/or measurements to the controller 12. In various embodiments, the sensors 22 supply, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight (e.g., takeoff weight), time/date information, heading information, data related to atmospheric conditions, flight path data, flight track data, radar altitude data, geometric altitude data, wind speed, direction data, height from ground measurement data, aircraft parameters (e.g., motor configuration, center-of-gravity location, etc.), control settings (e.g., RPM of rotor, cyclic setting, collective setting, etc.). Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

With continued reference to FIG. 1, the display device 32 can include any number and type of image generating devices on which one or more avionic displays 34 may be produced. In various embodiments, the display device 32 may be affixed to the static structure of the aircraft 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 10 cockpit by a pilot.

In some examples, at least one avionic display 34 is generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The display device 32 is configured to continuously render at least one avionic display 34 showing a terrain environment at a current location of the aircraft 10. The avionic display 34 generated and controlled by the system 100 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In some examples, the user interface 18 may include user control devices such as cyclic control input devices, collective input devices, and pedals input devices. In various examples, a human-machine interface, such as a touch screen display, is implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

During typical operation, the controller 12 obtains relevant data from the sensors 22, the database 28, the memory 16, and/or the remote source(s) 40. The controller 12 may then process the relevant data to compute whether the aircraft 10 is in a potential static or dynamic rollover condition, which indicates that dynamic rollover of the aircraft is imminent, or in other words, that dynamic rollover will occur within a predetermined period of time under the current conditions of the aircraft 10. The controller 12 may then present the static or dynamic rollover condition data and/or alerts such that a user (e.g., a flight crew member) may take action to prevent rollover of the aircraft 10. Here, current data associated with the aircraft 10 may be continuously or periodically compared with data stored. An alert may be presented, which conveys to flight crew members that, for example, there is a possibility of static or dynamic rollover in the current situation, and the cause of the potential static or dynamic rollover condition.

Referring now to FIG. 2, and with continued reference to FIG. 1, a diagram of the aircraft 10 is presented that illustrates various aspects of dynamic rollover conditions. In FIG. 2, the aircraft 10 includes a fuselage 210, main rotor blades 212, and landing gear elements that, in this example, include a first skid 214 and a second skid 216. As depicted, the first skid 214 is in contact with a surface 202 and the second skid 216 is elevated above the surface 202. A point of contact between the first skid 214 and the surface 202 defines a pivot point 215. Also depicted is a center of gravity 218 of the aircraft 10, current thrust 224 of the aircraft 10 generated by the main rotor blades 212 while at a cyclic setting equal to zero degrees, and a maximum thrust 222 of the aircraft 10 that may be generated to counter a dynamic rollover about the pivot point 215 while at a cyclic setting equal to a maximum cyclic angle ($\varphi_{max\_cyclic}$).

A current roll angle ($\varphi$) is defined between the surface 202 and a line 226 extending straight between contact surfaces of the first skid 214 and the second skid 216. A critical roll angle ($\varphi_{crit}$) represents a point at which dynamic rollover will occur even with the maximum thrust 222 in the opposite direction. Therefore, if the current roll angle ($\varphi$) is equal to or greater than the critical roll angle ($\varphi_{crit}$), the aircraft 10 will experience a static or dynamic rollover. A maximum roll angle ($\varphi_{max}$) and a safety margin angle ($\varphi_{margin}$) are also represented. The maximum roll angle ($\varphi_{max}$) represents a limit on the current roll angle ($\varphi$) of the aircraft 10 defined by the critical roll angle ($\varphi_{crit}$) minus the safety margin angle ($\varphi_{margin}$). The safety margin angle ($\varphi_{margin}$) may be preprogrammed and may vary depending on a desired level of safety of the aircraft 10.

During operation of the aircraft 10, the pilot may adjust the thrust direction and/or magnitude to reduce the current roll angle ($\varphi$) such that the current roll angle ($\varphi$) does not reach the critical roll angle ($\varphi_{crit}$). In some examples, the controller 12 may be configured to generate an alert in response to the aircraft 10 reaching the maximum roll angle ($\varphi_{max}$). Optionally, once the aircraft 10 is past the maximum roll angle ($\varphi_{max}$), the controller 12 may modify the alert and/or generate one or more additional alerts as the current roll angle ($\varphi$) approaches the critical roll angle ($\varphi_{crit}$) to communicate the increasing likelihood of a dynamic rollover.

Figure 3:
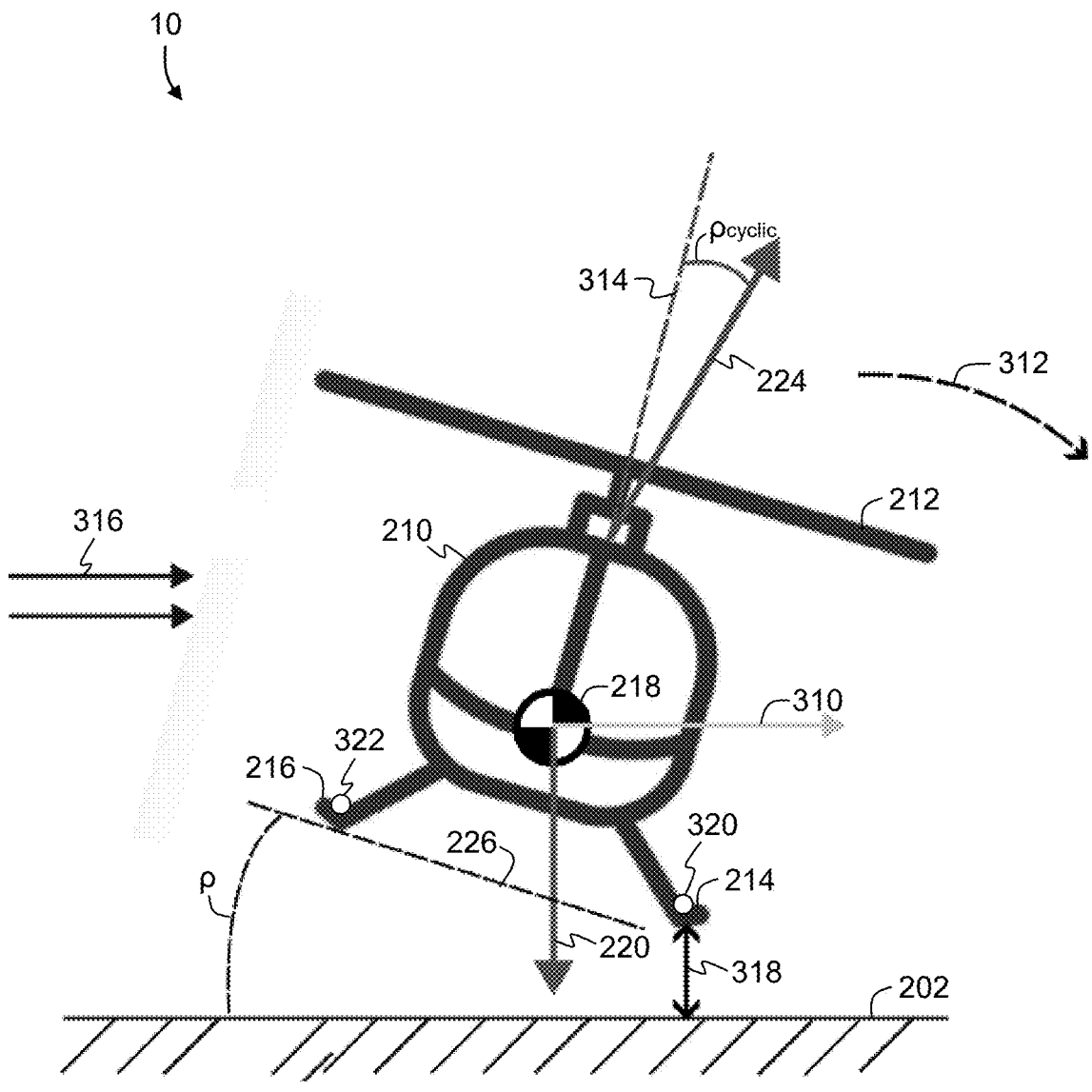
FIG. 3 is a diagram illustrating the mobile platform while in flight at a low altitude in accordance with an embodiment.

Referring now to FIG. 3, and with continued reference to FIGS. 1-2, a diagram of the aircraft 10 is presented that illustrates various aspects of flight at low altitudes (e.g., close-to-ground flight) during which the system 100 may be used to predict potential dynamic rollover conditions. In this example, the aircraft 10 is in flight and the first skid 214 is positioned at a height 318 above the surface 202. In addition to gravity 220 and the current thrust 224, additional forces acting upon the aircraft 10 include a roll angular rate 312 of the aircraft 10 and crosswinds 316. These forces act upon the aircraft 10 to produce a lateral speed 310. The direction of the current thrust 224 may be controlled by the pilot, for example, by adjusting a cyclic angle ($\varphi_{cyclic}$) of the aircraft 10 from a line 314 (i.e., representing a direction of thrust at a cyclic angle ($\varphi_{cyclic}$) equal to zero.

In FIG. 3, the aircraft 10 may be landing, taking off, or hovering. During this time, the controller 12 may continuously or periodically monitor for potential dynamic rollover conditions. For example, the controller 12 may monitor the current position of the aircraft 10 and the current forces acting upon the aircraft 10, and determine whether the aircraft 10 would reach or exceed the critical roll angle ($\varphi_{crit}$) upon contact of the first skid 214 with the surface 202. The controller 12 may predict the potential roll angle of the aircraft 10 based on various parameters such as the current roll angle ($\varphi$) and the magnitude and direction of the forces acting upon the aircraft 10.

In some examples, the controller 12 may be configured to generate an alert in response to detection of potential dynamic rollover conditions while at least one of the first skid 214 and the second skid 216 is below a minimum height threshold from the surface 202. In various examples, the height of the first skid 214 and the second skid 216 above the surface 202 may be determined based on signals received from one or more of the sensors 22 located in or adjacent to the first skid 214 and the second skid 216. For example, the first skid 214 may include a first ultrasonic sensor 320 and the second skid 216 may include a second ultrasonic sensor 322 that are operable to measure the height of the first skid 214 and the second skid 216, respectively, from the surface 202.

Figure 4:
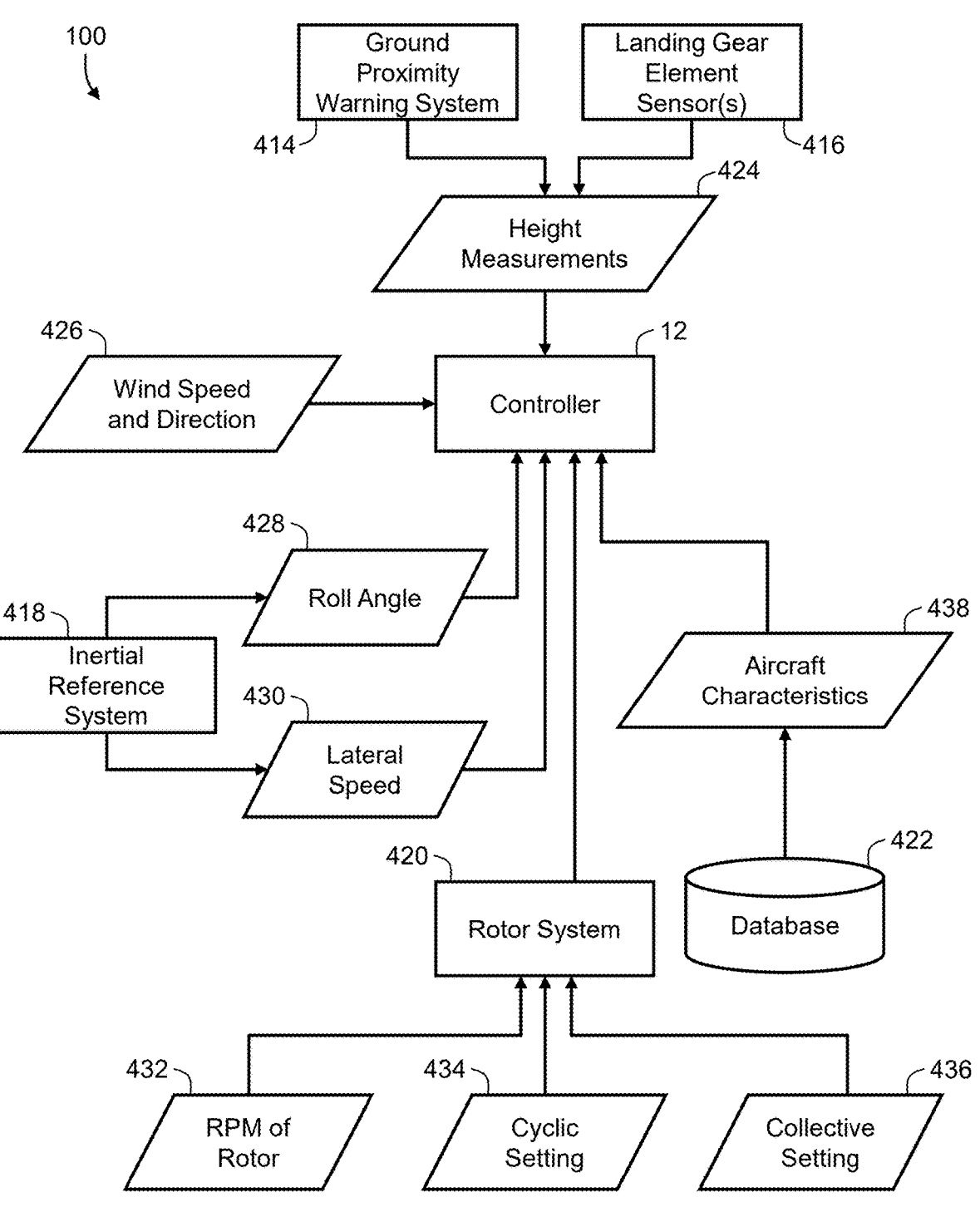
FIG. 4 is a dataflow diagram illustrating operation of the system of FIG. 1 for detection and warning of rollover conditions for the aircraft of FIG. 1 in accordance with an embodiment.

Referring now to FIG. 4, a dataflow diagram is provided for exemplary operation of the system 100 for detection and warning of rollover conditions for the aircraft 10. In this example, the controller 12 may continuously or periodically receive input from various sources. For example, the controller 12 may receive height measurements 424 of one or more components of the aircraft 10 from a surface therebelow (e.g., ground). For example, the controller 12 may receive height measurements 424 from a ground proximity warning system 414 and/or from one or more sensors 416 associated with landing gear elements (e.g., skids or wheels) of the aircraft 10. The controller 12 may receive wind speed and direction 426 information from one or more sources (not shown) onboard or remote from the aircraft 10 which typically provide such information. The controller 12 may receive a roll angle 428 and lateral speed 430 from, for example, an inertial reference system 418. The controller 12 may receive operating conditions of the rotor of the aircraft 10 including, for example, revolutions per minute 432, cyclic setting 434, and collective setting 436 from a rotor control system 420. The controller 12 may receive aircraft characteristics 438 (e.g., center of gravity position, take-off weight, etc.) from one or more databases 422 (e.g., the databases 28). The controller 12 may use the various input data described in FIG. 4 and/or other input data to perform the functions of the system 100, such as executing various rollover prevention methods.

The systems disclosed herein, including the system 100, provide for methods of detection and warning of rollover conditions for a mobile platform, such as various rotorcraft (e.g., helicopters). For example, FIG. 5 is a flowchart illustrating an exemplary first method 500. The method 500 may start at 510. In some examples, the method 500 may execute continuously during operation of the mobile platform. In other examples, the method 500 may initiate upon the mobile platform operating below a predetermined altitude.

At 512, the method 500 may include receiving, with a controller (e.g., the controller 12) onboard the mobile platform, input data indicative of information relevant to predicting dynamic rollover conditions. In some examples, the input data may include mobile platform data indicative of configurations of the mobile platform (e.g., rotor and engine models/configurations, cyclic and collective settings, etc.), sensor data indicative of operating conditions of the mobile platform (e.g., pitch and roll angles, height from ground, RPM of rotor, high lateral velocity, etc.) as received from one or more sensors onboard the mobile platform, and/or environmental data indicative of environment conditions external to the mobile platform (e.g., ground slope, crosswinds, etc.).

At 514, the method 500 may include processing, by one or more processors of the controller, the data to detect current or potential static or dynamic rollover conditions. The method 500 may be used while the mobile platform is in contact with a surface (e.g., the ground) and/or while the mobile platform is in flight. In some examples, the method 500 may include predicting dynamic rollover conditions by determining a force and moment balance based on, for example, current thrust magnitude and direction, gravity, and a moment of inertia of the mobile platform, determining an angular roll rate of the mobile platform based on, for example, the force and moment balance and RPM of rotor, Inertial Reference System (IRS) position, and collective setting, and then predicting the dynamic rollover conditions based on, for example, the crosswind, ground slope, and the angular roll rate.

At 516, the method 500 may include determining whether current or potential static or dynamic rollover conditions of the aircraft exist based, at least in part, on the roll angle, the angular roll rate, and the critical rollover angle.

At 518, the method 500 may include generating an alert in response to detection of the current or potential static and/or dynamic rollover conditions. In some examples, the alert may be generated in response to the current or potential static or dynamic rollover conditions exceeding a threshold. For example, the alert may be generated in response to a current rollover angle of the mobile platform exceeding a maximum roll angle defined by a critical rollover angle minus a safety margin angle.

The method 500 may end at 520.

In some examples, the method 500 may include dynamically measuring a height of landing gear elements (e.g., skids) of the mobile platform from a surface (e.g., ground) using one or more sensors (e.g., ultrasonic sensors) secured to each of the landing gear elements, and predicting a risk of dynamic rollover at least in part based on the measured height.

In some examples, the method 500 may include automatically adjusting operation of the mobile platform to perform corrective action to reduce a likelihood of static or dynamic rollover in response to detecting the current or potential static and/or dynamic rollover conditions.

Figure 6:
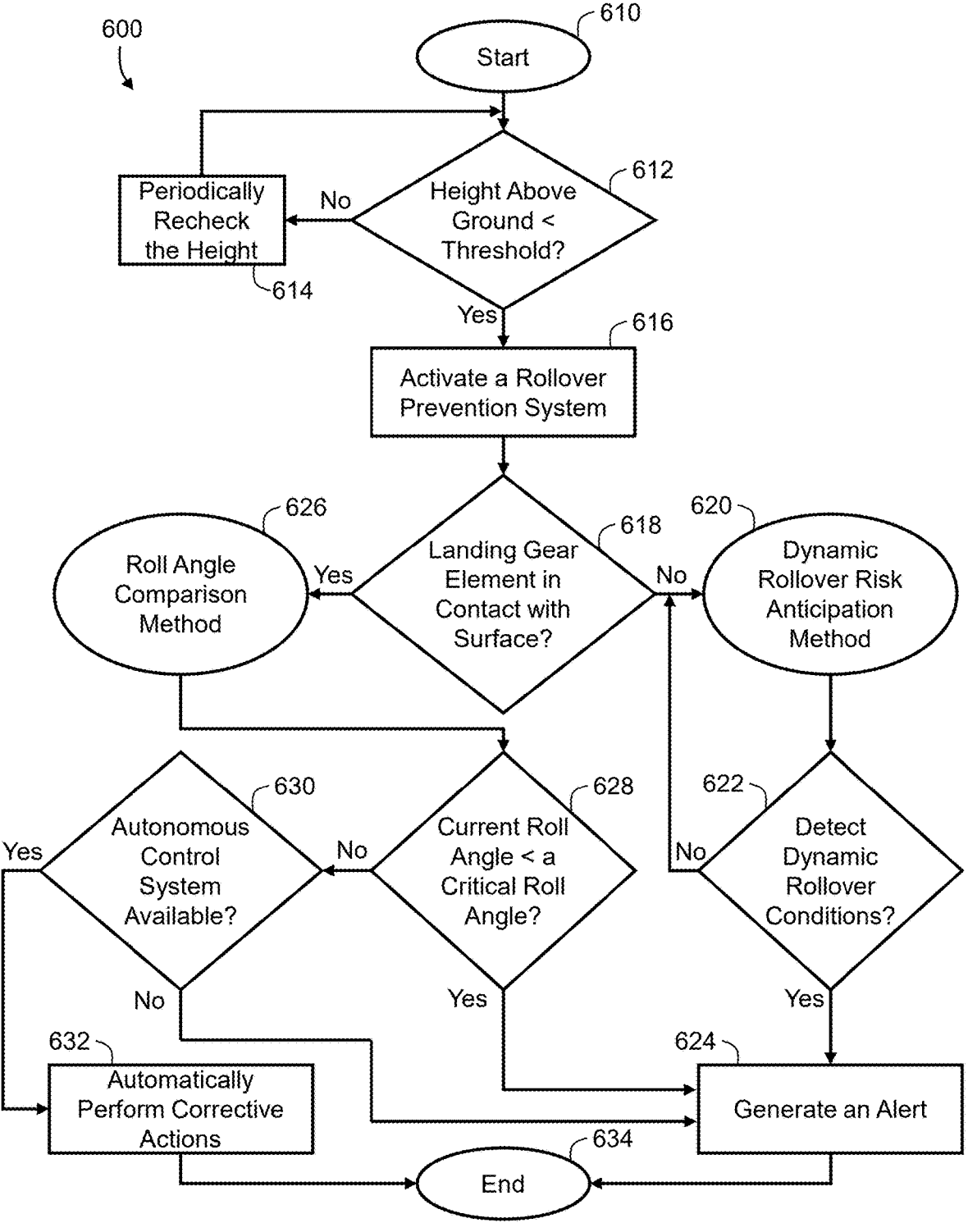
FIG. 6 is a flowchart illustrating an exemplary second method for detection and warning of rollover conditions in accordance with an embodiment.

Referring now to FIG. 6, a flowchart is provided illustrating another exemplary method 600 for preventing or reducing a likelihood of rollover of an aircraft, for example, as performed by the system 100. The method 600 may start at 610. In some examples, the method 600 may execute continuously during operation of the mobile platform. In other examples, the method 600 may initiate upon the mobile platform operating below a predetermined altitude.

At 612, the method 600 may include determining whether the aircraft is below a minimum height above ground threshold (e.g., five feet). If the aircraft is above the threshold at 610, the method 600 may periodically recheck the height of the aircraft above ground at 614. If the aircraft is determined to be below the threshold at 612, the method 600 may include activating a rollover prevention system at 616. At 618, the method 600 may include determining whether a landing gear element of the aircraft is in contact with a surface (e.g., ground) and whether pivoting of the aircraft about the landing gear element has begun.

If none of the landing gear elements of the aircraft are in contact with a surface at 618, the method 600 may include performing a dynamic rollover risk anticipation method at 620. At 622, the method 600 may include processing various input data, such as the input data described in reference to FIG. 4, to detect current and/or potential dynamic rollover conditions. In some examples, determining whether current or potential dynamic rollover conditions of the aircraft exist is based, at least in part, on the roll angle, the angular roll rate, and the critical rollover angle. If current and/or potential dynamic rollover conditions are detected, the method 600 may include at 624 generating an alert, such as a visual graphic on a display device. If current and/or potential dynamic rollover conditions are not detected, the method 600 may return to 620 to continue receiving and monitoring the input data.

If one of the landing gear elements is in contact with the surface at 618, the method 600 may include performing a roll angle comparison method at 626 that includes processing the input data to detect current and/or potential static or dynamic rollover conditions. At 628, the method 600 may include comparing the current roll angle of the aircraft to a critical roll angle. In this example, the method 600 includes determining whether the current roll angle exceeds the critical roll angle minus a safety margin angle. If the current roll angle is less than the critical roll angle minus a safety margin angle at 628, the method 600 may include at 624 generating an alert, such as a visual graphic on a display device.

If the current roll angle is equal to or greater than the critical roll angle minus a safety margin angle at 628, the method 600 may include at 630 determining whether an autonomous control system (i.e., autopilot) is available for the aircraft. If the autonomous control system is available at 630, the method 600 may include at 632 automatically modifying operation of the aircraft to perform corrective actions intended to prevent or reduce a likelihood of static or dynamic rollover. If the autonomous control system is not available at 630, the method 600 may include at 624 generating an alert, such as a visual graphic on a display device.

The method 600 may end at 634.

In some examples, the method 600 may include generating different alerts depending on the specific static or dynamic rollover conditions detected. For example, the controller may generate a first alert from 622 that include a visual graphic with the text "Rollover Warning," generate a second alert from 628 that includes a visual graphic with the text "Rollover Risk," and generate a third alert from 630 that includes a visual graphic with the text "Rollover Danger." In such an example, each of the first, second, and third alerts may indicate an increasing likelihood of imminent rollover. In some examples, the alert generated may include various aspects intended to emphasize the likelihood of rollover, such as flashing lights, audible warnings, etc.

The systems and methods disclosed herein provide various benefits over certain existing systems and methods. For example, the systems and methods provide for early warning of current or potential static or dynamic rollover conditions that allow for a pilot to perform immediate corrective actions to reduce the likelihood of rollover. In some examples, the system and methods may provide for automatic corrective actions to reduce the likelihood of rollover.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:

receiving, with a controller onboard an aircraft, input data;

processing, by one or more processors of the controller, the input data to dynamically determine a roll angle of the aircraft, an angular roll rate of the aircraft, and a critical rollover angle of the aircraft;

determining, by the one or more processors of the controller, whether current or potential static or dynamic rollover conditions of the aircraft exist based, at least in part, on the roll angle, the angular roll rate, and the critical rollover angle; and generating, by the one or more processors of the controller, an alert in response to determining that the current or potential static or dynamic rollover conditions exist.

2. The method of claim 1, further comprising, by the one or more processors of the controller:

determining a force and moment balance using the magnitude and direction of thrust of the aircraft, gravity, and a moment of inertia of the aircraft;

determining the angular roll rate based on the force and moment balance, and revolutions per minute (RPM) of a rotor of the aircraft, an Inertial Reference System (IRS) position, and collective setting; and determining whether potential dynamic rollover conditions exist based, at least in part, on the crosswind, surface slope, and the angular roll rate.

3. The method of claim 1, wherein the input data includes aircraft data indicative of configurations of the aircraft including a rotor configuration, a cyclic setting and a collective setting, sensor data indicative of operating conditions of the aircraft including a pitch angle, the roll angle, a height from a surface, revolutions per minute of a motor of the aircraft, and a lateral velocity of the aircraft, and environmental data indicative of an environment conditions external to the aircraft including surface slope and crosswind.

4. The method of claim 1, wherein generating the alert is in response to the roll angle exceeding the critical rollover angle minus a safety margin angle.

5. The method of claim 1, wherein generating the alert is in response to determining that current or potential static rollover conditions exist.

6. The method of claim 1, further comprising:
dynamically measuring a height of a landing gear element of the aircraft from a surface therebelow using one or more ultrasonic sensors secured to the landing gear element, and
determining that potential dynamic rollover conditions exist based on, at least in part, the measured height.

7. The method of claim 1, further comprising automatically adjusting operation of the aircraft to perform a corrective action to reduce a likelihood of static or dynamic rollover in response to detecting the current or potential static or dynamic rollover conditions.

8. The method of claim 7, wherein generating the alert is in response to the roll angle exceeding a first threshold angle and automatically adjusting operation of the aircraft to perform the corrective action is in response to the roll angle exceeding a second threshold angle that is greater than the first threshold angle.

9. A system for an aircraft, comprising:
one or more sensors onboard the aircraft;
a controller onboard the aircraft that is in operable communication with the one or more sensors, wherein the controller is configured to, by one or more processors:
receive input data from the one or more sensors and, optionally, one or more other sources;
process the input data to dynamically determine a roll angle of the aircraft, an angular roll rate of the aircraft, and a critical rollover angle of the aircraft;
determine whether current or potential static or dynamic rollover conditions of the aircraft exist based, at least in part, on the roll angle, the angular roll rate, and the critical rollover angle; and
generate an alert in response to determining that the current or potential static or dynamic rollover conditions exist.

10. The system of claim 9, wherein the controller is configured to, by the one or more processors:
determine a force and moment balance using the magnitude and direction of thrust of the aircraft, gravity, and a moment of inertia of the aircraft;
determine the angular roll rate based on the force and moment balance, and RPM of a rotor of the aircraft, Inertial Reference System (IRS) position, and collective setting; and
determine whether potential dynamic rollover conditions exist based, at least in part, on the crosswind, surface slope, and the angular roll rate.

11. The system of claim 9, wherein the input data includes aircraft data indicative of configurations of the aircraft including a rotor configuration, a cyclic setting and a collective setting, sensor data indicative of operating conditions of the aircraft including a pitch angle, the roll angle, a height from a surface, revolutions per minute of a motor of the aircraft, and a lateral velocity of the aircraft, and environmental data indicative of an environment conditions external to the aircraft including surface slope and crosswind.

12. The system of claim 9, wherein the controller is configured to, by the one or more processors, generate the alert in response to the roll angle exceeding the critical rollover angle minus a safety margin angle.

13. The system of claim 9, wherein the controller is configured to, by the one or more processors, generate the alert in response to determining that current or potential static rollover conditions exist.

14. The system of claim 9, wherein the controller is configured to, by the one or more processors:
receive a measured height of a landing gear element of the aircraft from a surface therebelow using one or more ultrasonic sensors secured to the landing gear element; and
determine that potential dynamic rollover conditions exist based on, at least in part, the measured height.

15. The system of claim 9, wherein the controller is configured to, by the one or more processors, initiate automatic adjustment of operation of the aircraft to perform a corrective action to reduce a likelihood of static or dynamic rollover in response to detecting the current or potential static or dynamic rollover conditions.

16. The system of claim 15, wherein the controller is configured to, by the one or more processors, generate the alert in response to the roll angle exceeding a first threshold angle and initiate the automatic adjustment of the operation of the aircraft to perform the corrective action in response to the roll angle exceeding a second threshold angle that is greater than the first threshold angle.

17. An aircraft, comprising:
at least first and second landing gear elements each configured to contact a surface and support the aircraft thereon;
a sensor system including a plurality of sensors including a first sensor configured to measure a first height of the first landing gear element from the surface and a second sensor configured to measure a second height of the second landing gear element from the surface;
a controller in operable communication with the sensor system, wherein the controller is configured to, by one or more processors:
receive input data from the sensor system and, optionally, one or more other sources, wherein the input data includes the first height and the second height;
process the input data to dynamically determine a roll angle of the aircraft, an angular roll rate of the aircraft, and a critical rollover angle of the aircraft;
determine whether current or potential static or dynamic rollover conditions of the aircraft exist based, at least in part, on the roll angle, the angular roll rate, the critical rollover angle, the first height, and the second height; and
generate an alert in response to determining that the current or potential static or dynamic rollover conditions exist.

18. The aircraft of claim 17, wherein the controller is configured to, by the one or more processors:
determine a force and moment balance using the magnitude and direction of thrust of the aircraft, gravity, and a moment of inertia of the aircraft;

determine the angular roll rate based on the force and moment balance, and RPM of a rotor of the aircraft, Inertial Reference System (IRS) position, and collective setting; and determine whether potential dynamic rollover conditions exist based, at least in part, on the crosswind, surface slope, and the angular roll rate.

19. The aircraft of claim 17, wherein the controller is configured to, by the one or more processors, generate the alert in response to the roll angle exceeding the critical rollover angle minus a safety margin angle.

20. The aircraft of claim 17, further comprising an autonomous control system configured to automatically adjust of operation of the aircraft to perform a corrective action to reduce a likelihood of static or dynamic rollover in response to the controller determining that the current or potential static or dynamic rollover conditions exist.

\* \* \* \* \*